(12) United States Patent
Walter et al.

(10) Patent No.: US 10,723,636 B2
(45) Date of Patent: Jul. 28, 2020

(54) PURIFICATION DEVICE AND PURIFICATION METHOD FOR WATER UTILIZING FILTER CARTRIDGES

(71) Applicant: SARTORIUS LAB INSTRUMENTS GMBH & CO. KG, Goettingen (DE)

(72) Inventors: Fabian Walter, Northeim (DE); Matthias Grabosch, Bovenden (DE); Roman Ritzka, Obernfeld (DE); Sebastian Purmann, Goettingen (DE); Dennis Groesche, Goettingen (DE); Martin Lohrberg, Ebergoetzen (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 16 days.

(21) Appl. No.: 15/676,656

(22) Filed: Aug. 14, 2017

(65) Prior Publication Data
US 2018/0009680 A1  Jan. 11, 2018

Related U.S. Application Data

(63) Continuation of application No. PCT/EP2016/000151, filed on Jan. 29, 2016.

(30) Foreign Application Priority Data

Feb. 12, 2015 (DE) .......................... 10 2015 102 011

(51) Int. Cl.
*C02F 1/44* (2006.01)
*B01D 61/04* (2006.01)
(Continued)

(52) U.S. Cl.
CPC ............ *C02F 1/441* (2013.01); *B01D 61/025* (2013.01); *B01D 61/04* (2013.01); *B01D 61/10* (2013.01);
(Continued)

(58) Field of Classification Search
CPC ............... C02F 9/005; C02F 2201/003; C02F 2201/006; C02F 2201/007; B01D 2313/44; B01D 2313/20
See application file for complete search history.

(56) References Cited

U.S. PATENT DOCUMENTS 5,078,864 A * 1/1992 Whittier ................. B01D 61/08
                                                                  210/137
5,078,876 A    1/1992 Whittier et al.
(Continued)

FOREIGN PATENT DOCUMENTS

CH        704440 B1     8/2012
DE     19828840 C1    10/1999
(Continued)

OTHER PUBLICATIONS

Water Purification Systems, "Installation and Operating Manual—arium pro UF/VF", Sartorius Lab Instruments GmbH & Co. KG, Apr. 2014, Germany, 180 pages.
(Continued)

*Primary Examiner* — Benjamin M Kurtz
(74) *Attorney, Agent, or Firm* — Edell, Shapiro & Finnan, LLC

(57) ABSTRACT

A purification device for water has a housing with a longitudinal axis, an upper and a lower end and a substantially round cross section. The device includes a first receptacle, arranged parallel to the longitudinal axis of the housing, for a first purification medium, and a second receptacle, which is also arranged parallel to the longitudinal axis of the housing, for a second purification medium. The receptacle for the second purification medium is arranged eccentrically with respect to the longitudinal axis of the housing.

14 Claims, 6 Drawing Sheets

(51) Int. Cl.
- *C02F 9/00* (2006.01)
- *B01D 61/02* (2006.01)
- *B01D 61/10* (2006.01)
- *C02F 1/28* (2006.01)
- *C02F 1/42* (2006.01)
- *C02F 1/20* (2006.01)
- *C02F 1/04* (2006.01)
- *C02F 1/32* (2006.01)
- *C02F 103/04* (2006.01)
- *C02F 103/08* (2006.01)

(52) U.S. Cl.
CPC ............... *C02F 1/283* (2013.01); *C02F 1/42* (2013.01); *C02F 9/005* (2013.01); *B01D 2311/2623* (2013.01); *B01D 2311/2626* (2013.01); *B01D 2313/20* (2013.01); *B01D 2313/44* (2013.01); *C02F 1/04* (2013.01); *C02F 1/20* (2013.01); *C02F 1/32* (2013.01); *C02F 1/444* (2013.01); *C02F 2103/04* (2013.01); *C02F 2103/08* (2013.01); *C02F 2201/006* (2013.01); *C02F 2201/007* (2013.01)

(56) References Cited

U.S. PATENT DOCUMENTS

| | | |
|---|---|---|
| 5,919,357 A | 7/1999 | Wilkins et al. |
| 6,372,133 B1 | 4/2002 | von der Hardt et al. |
| 6,383,382 B1 * | 5/2002 | Johll, Jr. ............... B01D 35/301 |
| | | 210/266 |
| 7,722,766 B2 | 5/2010 | Namur |
| 8,414,767 B2 | 4/2013 | Gaignet et al. |
| 9,023,205 B2 | 5/2015 | Namur |
| 2008/0121581 A1 * | 5/2008 | Namur .................. A47J 31/605 |
| | | 210/282 |

FOREIGN PATENT DOCUMENTS

| | | |
|---|---|---|
| DE | 102004049876 A1 | 4/2006 |
| DE | 102004049877 A1 | 4/2006 |
| DE | 10195254 B4 | 2/2010 |
| EP | 1219342 A1 | 7/1999 |

OTHER PUBLICATIONS

"Arium Cartridges Sets for ultrapure water systems", Sartorius Stedim Biotech GmbH, Germany, Aug. 2011, 2 pages.

* cited by examiner

PURIFICATION DEVICE AND PURIFICATION METHOD FOR WATER UTILIZING FILTER CARTRIDGES

CROSS-REFERENCE TO RELATED APPLICATIONS

This is a Continuation of International Application PCT/EP2016/000151, which has an international filing date of Jan. 29, 2016, and the disclosure of which is incorporated in its entirety into the present Continuation by reference. The following disclosure is also based on and claims the benefit of and priority under 35 U.S.C. § 119(a) to German Patent Application No. DE 10 2015 102 011.4, filed on Feb. 12, 2015. The content of the patent application DE 10 2015 102 011.4 is also incorporated herein in its entirety, including the drawings and the claims by reference for all purposes, as well as an incorporation of any element or part of the description, the figures or the claims, not contained herein and referred to in rule 20.5 (a) of the PCT, pursuant to rule 4.18 of the PCT.

FIELD OF THE INVENTION

The present disclosure relates to a purification device for water.

BACKGROUND

In water purification, in particular for laboratory use, containers are commonly used that contain a medium that purifies the water. These containers are also called cartridges.

In this context the water to be purified is often passed through a filter of, for example, activated charcoal or an ion exchanger in a first purification stage, while in a second purification stage the water to be purified is passed through a reverse osmosis module.

Additional purification elements, such as, for example, a frit or a UV lamp or another ion exchanger can be added.

Due to space constraints the first purification stage is integrated with the second purification stage into a common unit.

If the first purification stage and the second purification stage are housed in separate housings, then this arrangement is not optimal due to the lack of space. In addition, both stages must be connected to each other hydraulically, which connection may be error-prone (for example, hose connection).

A concentric arrangement of the two purification stages in one housing (for example, the second purification stage in the form of a channel that is surrounded by the first purification stage in a concentric manner) is disclosed, for example, in the U.S. Pat. No. 8,414,767.

However, such an arrangement is not optimal for hydrodynamic reasons, because in this respect the external purification stage has a poor surface area to volume ratio, an aspect that has a negative effect on the flow and contacting of the material and, as a result, has an adverse effect on the adsorption. Moreover, such an arrangement also poses manufacturing problems.

The same kinds of drawbacks are also inherent in an embodiment, in which each of the two purification stages is arranged in the form of a half cylinder in a cylindrical housing. In addition, there is the drawback that a semi-cylindrical cross section does not lend itself to accommodating commercially available reverse osmosis modules that have a circular cross section.

Therefore, one object of the present invention is to provide a purification device for water, where in this case said purification device has a first and second purification medium and does not exhibit the aforementioned drawbacks.

An additional object of the present invention is to provide a purification device for water, where in this case said purification device has a first and second purification medium and dimensions that are more compact.

Therefore, another object of the present invention is to provide a purification device for water, where in this case said purification device has a first and second purification medium and is suitable for accommodating commercially available reverse osmosis modules without causing hydrodynamic problems.

These and other objects of the present invention are achieved with the methods and/or devices described herein. Value ranges, which are defined by numerical values, shall always include the said limit values.

SUMMARY

Before the purification device is described in detail, it is to be noted that the present invention is not limited to the specific components of the devices that are described or to the manufacturing steps of the method described herein, since these methods or devices may vary. It should also be noted that the respective terminology is used only for the purpose of describing specific embodiments and is not intentionally limited.

It should be noted that in the description employed and in the appended claims, the simple form, such as "a" or "the", includes both a singular and/or plural object, unless clearly stated otherwise in context. It should be noted that in the event that a parameter range is specified, the limiting numerical values are included in the disclosed or claimed numerical range.

Disclosed is a purification device for water, comprising a housing having a longitudinal axis, an upper and a lower end and a substantially round cross section. Furthermore, the purification device comprises a receptacle, arranged parallel to the longitudinal axis of the housing, for a first purification medium, as well as a receptacle, arranged parallel to the longitudinal axis of the housing, for a second purification medium. In this case the receptacle for the second purification medium is arranged eccentrically with respect to the longitudinal axis of the housing.

In typical embodiments the longitudinal axis of the housing is inside the receptacle for the second purification medium. In this case, however, this receptacle is arranged, as stated above, eccentrically with respect to the longitudinal axis of the housing.

The round cross section of the housing typically determines in essence the shape of the housing of the purification device. Usually the round cross section is at least substantially uniform over the entire height or length of the purification device. The receptacle for the first purification medium and the receptacle for the second purification medium are usually arranged inside the round cross section of the housing, and said cross section of the housing determines in essence the shape of the housing of the purification device. As a rule, the dimensions of the receptacle for the first purification medium and the receptacle for the second purification medium are at least substantially uniform along the entire height or length of the purification device.

In one embodiment the purification device comprises a housing having a longitudinal axis, an upper and a lower end, and a substantially round cross section. Inside the housing there is in this embodiment a first receptacle, arranged parallel to the longitudinal axis of the housing, for a first purification medium, as well as a second receptacle, arranged parallel to the longitudinal axis of the housing, for a second purification medium. In this case the receptacle for the second purification medium is inside the circular cross section of the housing and is arranged eccentrically with respect to the longitudinal axis of the housing.

In some embodiments the receptacle for the first purification medium may be a space that is defined by four side walls. In this case a first wall of this space may be defined by a section of a wall of the housing. A wall, which is opposite the first wall, may be defined by a section of a wall of the receptacle for the second purification medium. In some embodiments the four side walls may have, independently of each other, a thickness in the range of about 2 to 5 mm. In one embodiment all four side walls have a thickness of about 3.5 mm.

In some embodiments the receptacle for the first purification medium is defined by a space that has a volume of about 100 to 1,000 ml. In one exemplary embodiment the space of the receptacle for the first purification medium holds a volume of about 680 ml.

In some embodiments the receptacle for the first purification medium is designed to accommodate a bed of resins and/or activated charcoal. When such embodiments are used, the receptacle for the first purification medium can be filled correspondingly with a resin and/or activated charcoal.

In some embodiments the receptacle for the first purification medium does not have any walls or elements disposed inside the receptacle. In some embodiments one or more mechanical barriers are provided in the receptacle for the first purification medium; and these mechanical barriers are designed to prevent various filter materials, for example, beds, from being thoroughly mixed. Suitable barriers may be designed to separate different filter materials from each other. Examples of such a mechanical barrier are a frit or a sieve.

In some embodiments the receptacle for the second purification medium may be a space, which is defined by a circumferential wall. The circumferential wall may have a round, for example, circular, cross section. The circumferential wall may have a thickness in the range of about 2 to 5 mm. In one embodiment the circumferential wall has a thickness of about 3.5 mm.

In some embodiments the receptacle for the second purification medium is defined by a space that has a volume of about 100 to 1,000 ml. In one exemplary embodiment the space of the receptacle for the first purification medium holds a volume of about 580 ml.

In some embodiments the receptacle for the second purification medium is designed to accommodate a prefabricated purification module, such as, for example, a reverse osmosis module. When such embodiments are used, the receptacle for the second purification medium may be equipped correspondingly with a prefabricated purification module.

In some embodiments the receptacles for the first and for the second purification medium are separated from each other by one or more walls. In this case the receptacles for the first and for the second purification medium may define two independent spaces.

The purification media may be generally modules, beds, capsules or cartridges that comprise a medium selected from the group
- adsorbent (for example, activated charcoal)
- filter elements (for example, frits, reverse osmosis filters, ultra filters, hollow fiber filters, depth filters, cellulose filters)
- ion exchange resins (for example, cation exchange resin, mixed bed resin)
- pH adjusting substances (for example, calcium carbonate, magnesium carbonate)
- chromatographic media (for example, C18 silica gel), and/or
- catalysts.

The term "substantially round cross section" means that the base surface of the housing is derived from a circular shape, an ellipse or an oval, but may have recesses or similar modifications. In some embodiments said substantially round cross section is a substantially circular cross section.

Although in some embodiments the receptacle for the second purification medium is arranged eccentrically with respect to the longitudinal axis of the housing, it remains, however, inside the round cross section, which in essence determines the shape of the housing of the purification device.

In some embodiments it is also provided that the purification device has at least one ascending or descending channel, arranged parallel to the longitudinal axis of the housing, for the water to be purified. In some embodiments the purification device has two or more ascending or descending channels, arranged parallel to the longitudinal axis of the housing. In some embodiments there are two ascending channels, of which the first is connected between the first and the second purification medium, while the second is connected between the second purification medium and an outlet in such a way that the water that is to be purified, and that has passed through the first purification medium, flows through the first ascending channel into the second purification medium, and wherein subsequently, depending on the embodiment, purified water or osmosis residue ("bad water" or "concentrate") is fed through the second ascending channel in the direction of the outlet.

In some embodiments an ascending or descending channel may be defined by four side walls. In this case a first wall of this space may be defined by a section of a wall of the housing. One wall, which is located opposite the first wall, may be defined by a section of a wall of the receptacle for the second purification medium. In some embodiments the four side walls can have, independently of each other, a thickness in the range of about 2 to 5 mm. In one embodiment all four side walls have a thickness of about 3.5 mm.

In some embodiments the housing of the purification device may have a radius in the range of about 4 to about 10 cm. For example, the housing in one embodiment may have a radius of about 6 cm.

Furthermore, it is typically provided that the second purification medium has a substantially round, for example, a substantially circular cross section.

In some embodiments the receptacle for the second purification medium may be defined by a space that has a round, for example, a substantially circular cross section. In some embodiments the receptacle for the second purification medium may have a radius in the range of about 1.5 to about 8 cm. For example, the receptacle for the second purification medium in one embodiment may have a radius of about 2.5 cm.

The second purification medium may be, for example, a reverse osmosis module. Such reverse osmosis modules are pre-assembled and available in standard dimensions, for example, in the shape of a cylinder having a diameter of 1.8 inches (4.57 cm) and an overall length of 12 inches (30.5 cm).

In some embodiments the reverse osmosis module is a so-called winding module. In this case said module consists of two flat membrane sheets, which are separated from one another by a woven fabric and are wound in a spiral manner. The result is a concentrically arranged, central channel for the so-called "good" water (permeate).

In some embodiments it is provided that the second purification medium is a module, a bed, a capsule or a cartridge containing a mixture or stack of activated charcoal and ion exchange resin.

In some embodiments the receptacle for the first purification medium has a substantially crescent-shaped cross section. In this respect reference is made, in particular, toFIGS. 5A-5C, in addition to the description.

In some embodiments it is provided that the first purification medium is a module, a bed, a capsule or a cartridge containing a medium selected from the group
activated charcoal
ion exchange resin,
crosslinked polysaccharides (Sephadex, Sepharose) and/or
mixture or stack of activated charcoal and ion exchange resin.

See, e.g., Arium® Cartridge Sets for ultrapure water systems, Sartorius Stedim Biotech GmbH, August 2011.

In this purification stage the particulate and partially dissolved substances, which are retained by the purification medium by size exclusion or adsorption, are removed from the water to be purified.

In this context suitable examples may be found in the following embodiments shown in the table below, where in the second embodiment that is mentioned, the first and second purification mediums have in each case, for example, an activated charcoal/ion exchange resin mixture or stack having optionally a different quantitative composition.

TABLE 1

|  | First purification medium | Second purification medium |
| --- | --- | --- |
| Exemplary embodiment 1 | activated charcoal | reverse osmosis module |
| Exemplary embodiment 2 | activated charcoal/ ion exchange resin mixture or stack with a content of ≥10 and ≤40% by wt. of activated charcoal | activated charcoal/ ion exchange resin mixture or stack with a content of ≥10 and ≤40% by wt. of activated charcoal |
| Exemplary embodiment 3 | activated charcoal | activated charcoal |
| Exemplary embodiment 4 | ion exchange resin | ion exchange resin |

In the second embodiment one generally speaks of "water to be purified" and "purified water", whereas in the first embodiment one speaks of "water to be purified" and "good water" or, more specifically, "permeate" as well as "bad water" or "concentrate".

In typical embodiments the purification device, disclosed herein, has at least one cover lid, which is disposed at the upper end of the housing. The cover lid has one or more elements, selected from the group
inlet for the water to be purified
outlet for the purified water, and/or
outlet for any filtration or osmosis residue ("bad water" or "concentrate") that may have accumulated during the purification process.

In some embodiments the cover lid also has a frit, out of which the filter medium can flow. Optionally such a frit can also be used for the purpose of an upstream coarse purification of the water to be purified. In some embodiments the cover lid comprises two frits.

The term "frit" is defined as porous materials that comprise, for example, sintered polypropylene. As an alternative, it is possible to use glass frits that are produced, for example, by surface melting glass powder, where in this case the glass grains fuse together. In both cases the result is a porous material that is used, for example, as a filter in laboratory engineering. Last, but not least, the quenched material can be easily used to produce a powder by milling, which is also called a frit.

A purification device, as described above, may be designed to be integrated into a water purification system. Disclosed is also a water purification system, comprising a purification device, as described above.

In some embodiments such a water purification system also comprises at least one of the following elements for water treatment:
UV lamp
sterile filter
ultra filter
degassing module
distillation module See, e.g., Arium® pro UF|VF Installation and Operating Manual, Sartorius Lab Instruments GmbH & Co. KG, April 2014, pp. 66-81.

A use of a purification device or a water purification system, as described above, may relate to one or more tasks, selected from the group consisting of
purifying and producing pure or ultrapure water for laboratory use
purifying drinking water and water for food production
purifying water for the preparation of pharmaceutical products
desalinating seawater or brackish water
purifying and producing water for medicine use
purifying and producing process water for industrial processes, and/or
purifying wastewater.

BRIEF DESCRIPTION OF THE DRAWINGS

The FIGS. 1, 2A, 2B, 3, 4A and 4B show design drawings, so that it is possible to infer the ratios of dimensions relative to each other from the figures for the exemplary embodiments that are shown.

DETAILED DESCRIPTION

It should be noted that the figures and the examples are only of a descriptive nature and are not intended to limit the invention in any way.

Figure 1:
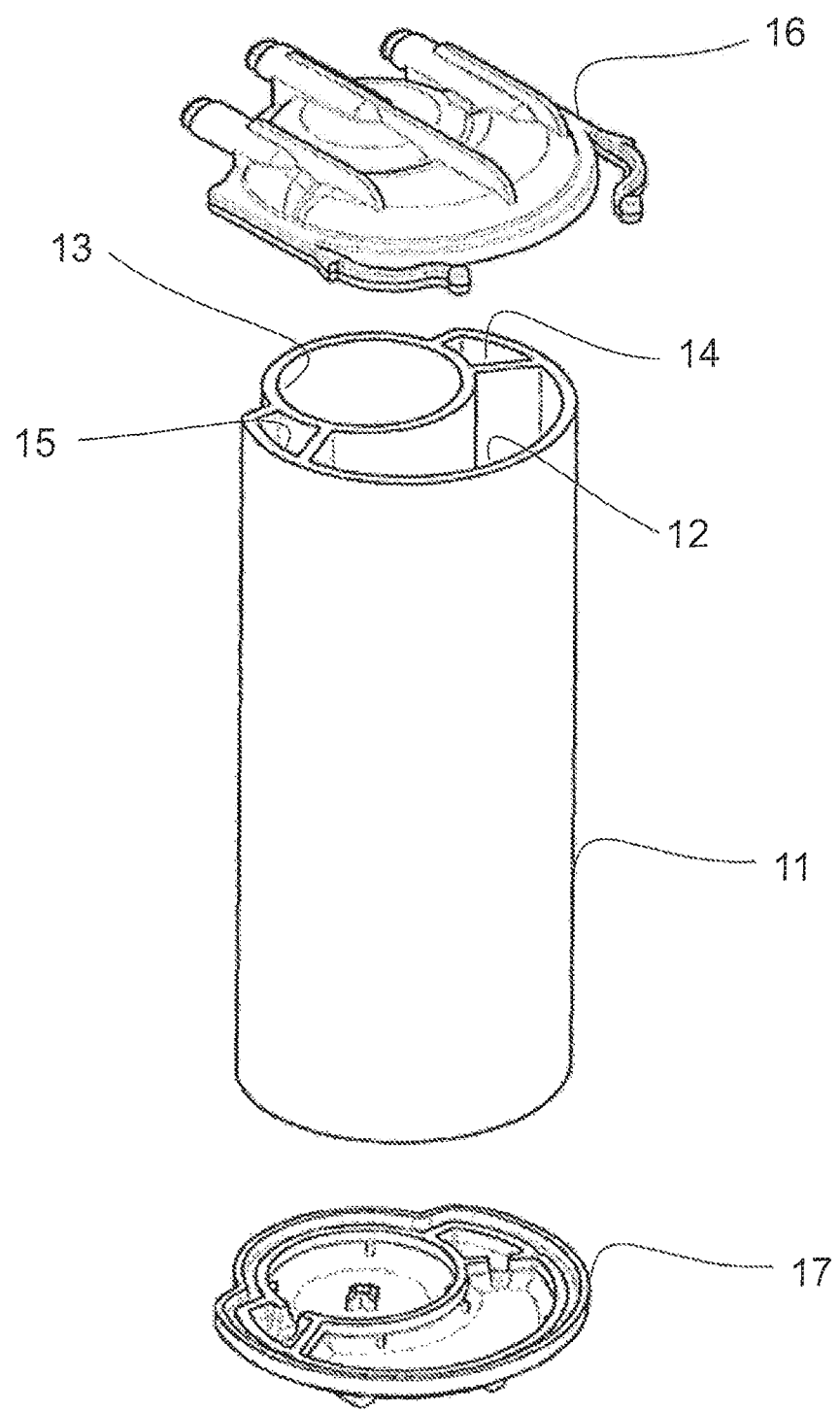
FIG. 1 shows a purification device with a housing 11 that comprises a receptacle 12 for a first purification medium, an additional receptacle 13 for a second purification medium having a substantially circular cross section as well as two ascending or descending channels 14 and 15. There is a cover lid 16 and a base member 17 at the opposite ends of the housing.

FIG. 1 shows a purification device comprising a housing 11 having a longitudinal axis, an upper and a lower end, and a substantially circular cross section. Furthermore, the housing 11 comprises a receptacle 12, arranged parallel to the longitudinal axis of the housing 11, for a first purification medium as well as an additional receptacle 13 for a second purification medium with a substantially circular cross section.

Furthermore, the housing 11 has two ascending channels 14 and 15 for the water to be purified. Furthermore, the housing 11 has a cover lid 16, which is disposed at the upper end of the housing, and a base member 17, which is disposed at the lower end of the housing.

The receptacle 13 for the second purification medium is arranged eccentrically with respect to the longitudinal axis of the housing 11. For example, a prefabricated reverse osmosis module having a circular cross section may be inserted into the receptacle 13.

The ascending channels make it possible to arrange all of the inlets and outlets in a plane in the area of the cover lid 16 of the housing 11, an aspect that facilitates the integration of the purification device, disclosed herein, into a water purification system and also prevents the water, contained in the cartridge, from escaping when changing such a cartridge.

As can be seen in FIG. 1 (see also FIG. 5C), the arrangement of the receptacle 13 and the ascending and/or descending channels 14 and 15 in the purification device produces an outer shape of the housing that has a gripping surface or gripping edge. Such an embodiment can facilitate the handling of the purification device.

Figure 2A:
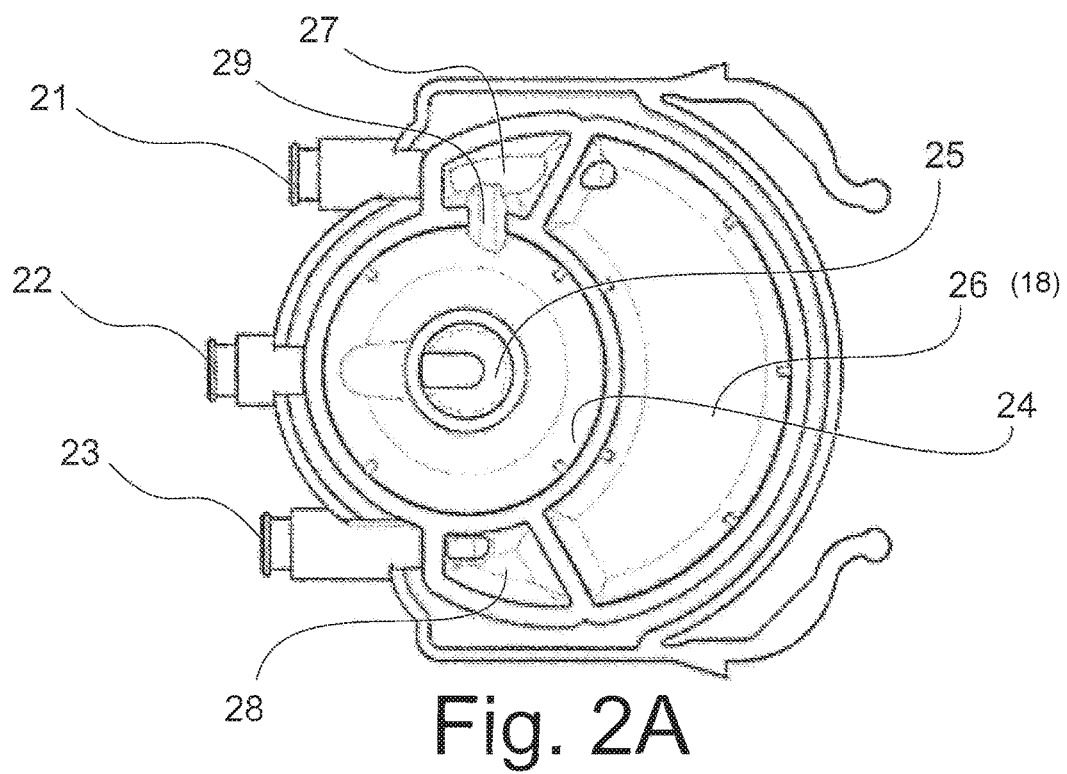
FIG. 2A shows from below a cover lid of a purification device with an inlet 21 and outlets 22 and 23. Areas 24, 25, 26, 27 and 28 are designed in such a way that they fit geometrically the elements of the purification device. A passage 29 allows the passage of fluid, such as, for example, a liquid.

FIG. 2A shows a cover lid of a purification device, disclosed herein, in a plan view from below. In this purification device the first purification medium comprises, for example, activated charcoal, while the second purification medium comprises a reverse osmosis module.

The cover lid has an inlet 21 for the water to be purified and an outlet 22 for the purified water ("good water" or "permeate"). Furthermore, an outlet 23 is provided for the osmosis residue ("bad water" or "concentrate") that has accumulated during reverse osmosis.

Furthermore, the cover lid has an area 24, which comes to rest above the receptacle for the reverse osmosis module when said cover lid is disposed on the housing, as well as a collecting area 25, which comes to rest above the inner channel of the reverse osmosis module when said cover lid is disposed on the housing. The good water (permeate) is fed to the outlet 22 by way of the collecting area 25.

When the reverse osmosis module is arranged in the receptacle, the bad water (concentrate) is collected in the area outside the channel, which is arranged concentrically in the module, and is fed to the outlet 23 by way of an ascending channel.

Furthermore, the cover lid has an area 26, which comes to rest above the receptacle for the first purification medium when the cover lid is arranged on the housing, and which can be filled with a frit 18 for the purpose of an upstream coarse purification of the water to be purified.

Furthermore, the cover lid has areas 27 and 28, which come to rest above the ascending channels when the cover lid is disposed on the housing.

Furthermore, the cover lid has the passage 29, through which water from the second ascending channel can flow into the area of the receptacle for the second purification medium.

Figure 2B:
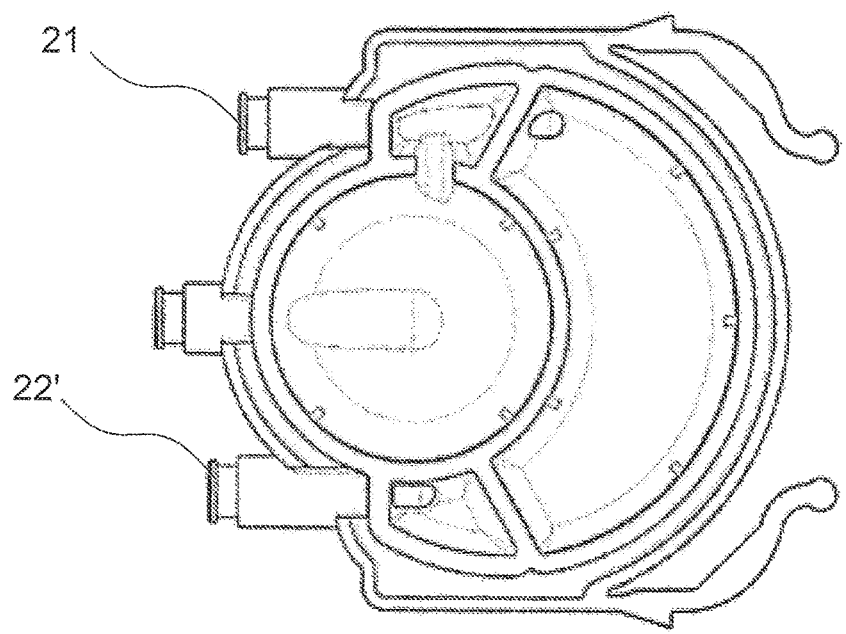
FIG. 2B shows an additional cover lid of a purification device from below. Basically the elements correspond for the most part to those shown in FIG. 2A and are, therefore, not provided again throughout with reference numerals. A centrally arranged outlet ends blind. This blind-ending outlet differs from FIG. 2A; similarly the outlet 22' is arranged at a different position than the outlet 22 in FIG. 2A.

FIG. 2B shows a cover lid of a purification device, disclosed herein, in a plan view from below with an inlet 21 for the water to be purified and an outlet 22' for the purified water. Since, in this embodiment the second purification medium is not based on the principle of reverse osmosis, there is no accumulation of any osmosis or filtration residue ("bad water" or "concentrate") that has to be removed, so that the centrally arranged outlet ends blind. Important is that the outlet 22' is disposed at a different location than the outlet 22 for the good water (permeate) of the reverse osmosis in FIG. 2A. At that location the good water (permeate) is collected in the central channel of the reverse osmosis module and is fed into a collecting area 25 of the cover lid, which comes to rest above this channel when the cover lid is disposed on the housing.

In FIGS. 2A and 2B, all of the inlets and outlets are disposed in nearly one plane in the area of the cover lid. This is a feature that facilitates the integration of the purification device, disclosed herein, into a water purification system.

Figure 3:
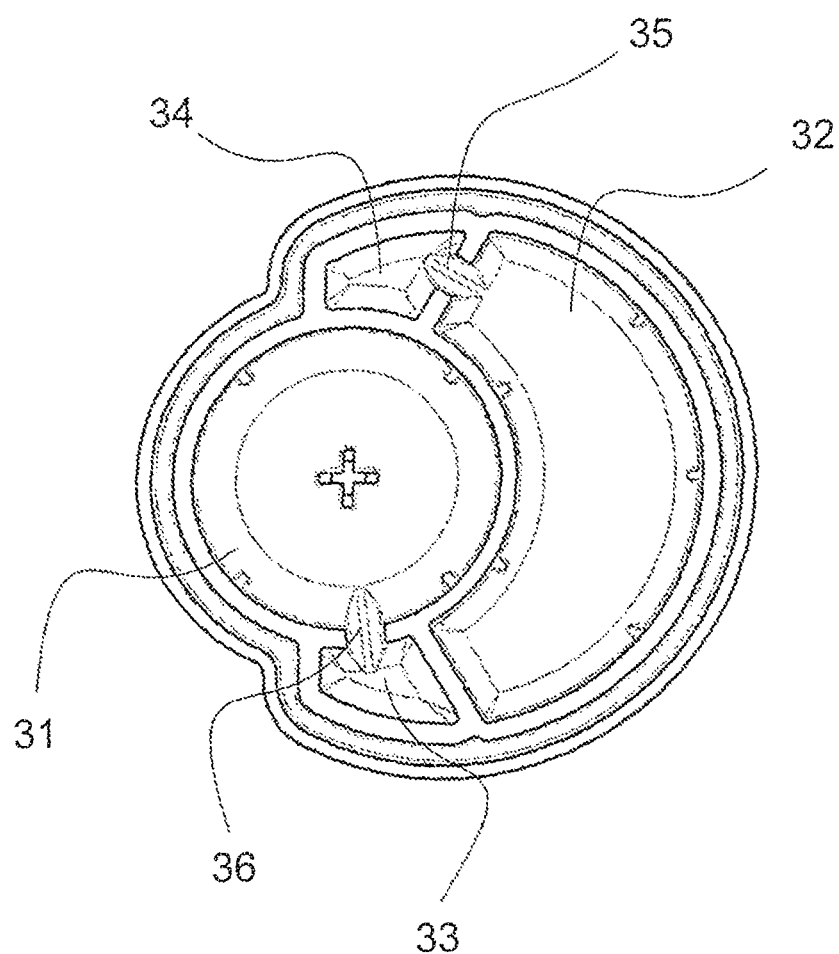
FIG. 3 shows from above a base member of a purification device with areas 31, 32, 33 and 34, which are designed in such a way that they geometrically fit the elements of the purification device. The passages 35 and 36 allow the passage of fluid, such as, for example, a liquid.

FIG. 3 shows a base member of a purification device, disclosed herein, in a plan view from above. Clearly visible are the areas 31, 32, 33 and 34, which come to rest below the receptacle for the second and the first purification medium or below the ascending channels when the base member is disposed on the housing.

Furthermore, the base member has passages 35 and 36, through which water from the first purification medium can flow into the first ascending channel and from the second purification medium into the second ascending channel.

Figure 4A:
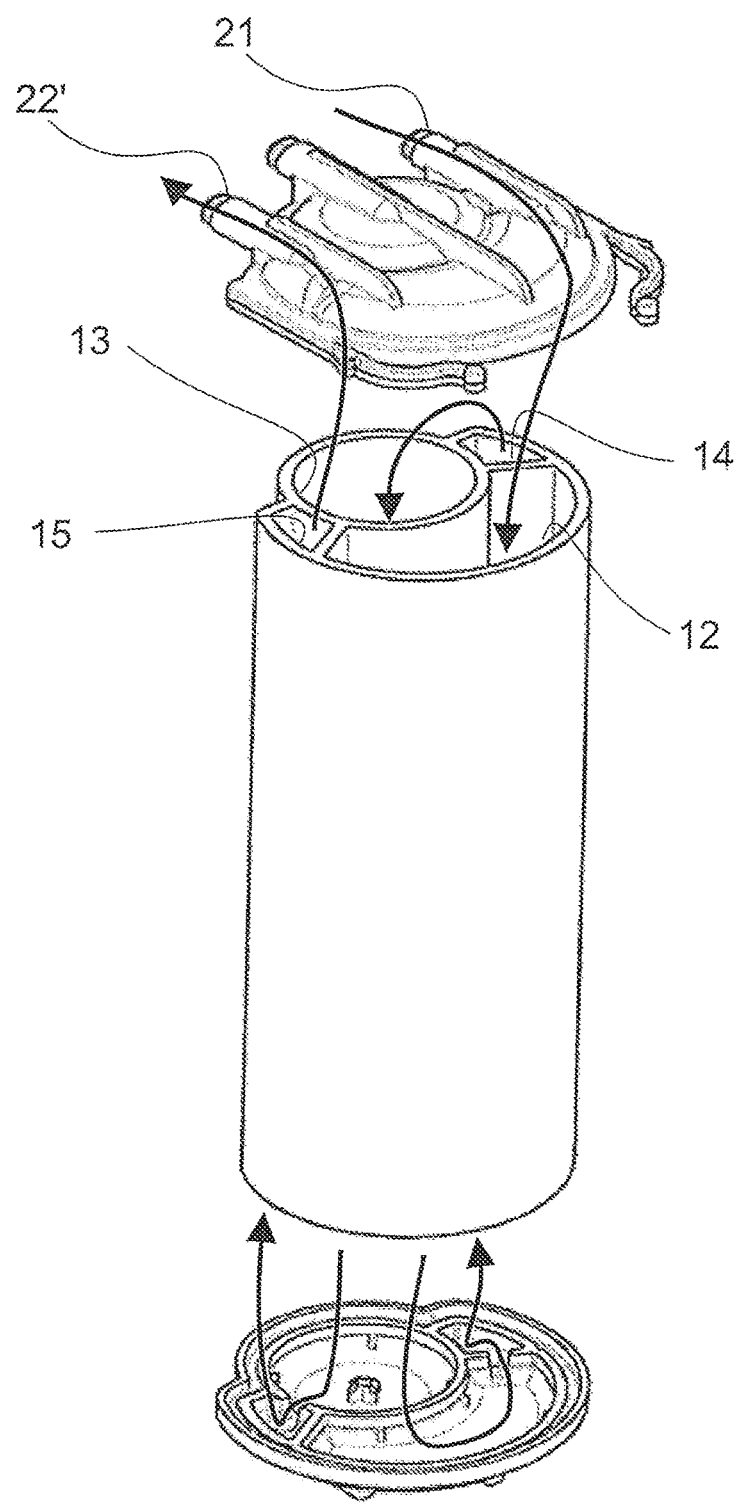
FIG. 4A shows a purification device, including the cover lid and the base member. Shown in schematic form is the flow pattern through the receptacles 12 and 13 and the ascending and descending channels 14 and 15 of the purification device as well as the inlet 21 and the outlet 22' of the cover lid.

FIG. 4A shows the flow pattern in a purification device, disclosed herein, without a reverse osmosis module as the second purification medium. In this embodiment the first and second purification medium may have in each case, for example, an activated charcoal/ion exchange resin mixture or stack having, if desired, a different quantitative composition.

It can be seen that the water to be purified flows through the inlet 21; passes through the first purification medium (not shown), which is arranged in the first receptacle 12; flows through the first ascending channel 14 into the second purification medium (not shown), which is arranged in the second receptacle 13; passes through this second purification medium, and then is fed through the second ascending channel 15 in the direction of the outlet 22' for the purified water.

Figure 4B:
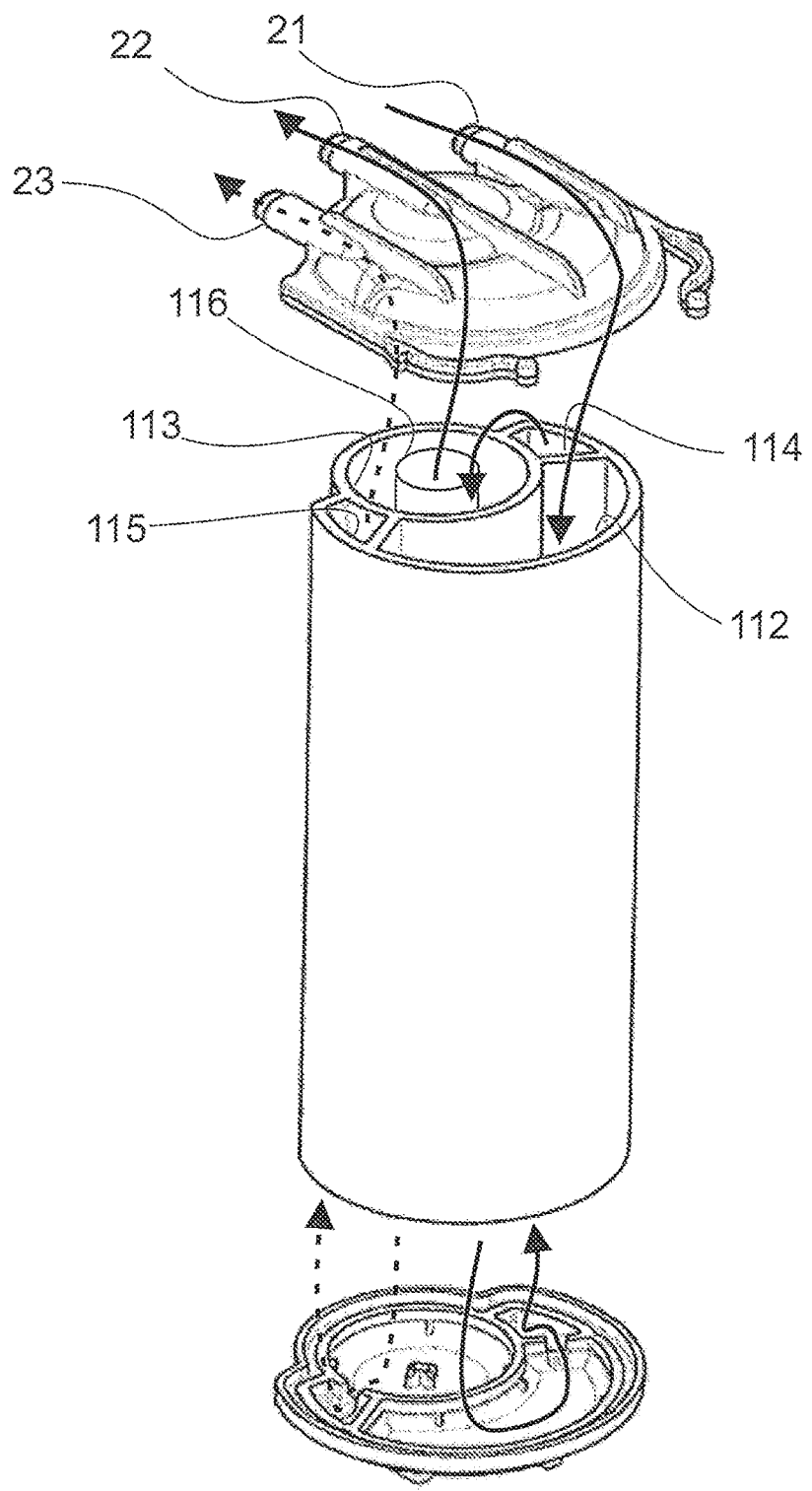
FIG. 4B also shows a purification device, including the cover lid and the base member. Shown in schematic form is the flow pattern through the receptacles 112 and 113 and the ascending and descending channels 114 and 115 of the purification device as well as the inlet 21 and the outlets 22 and 23 of the cover lid.

FIG. 4B shows the flow pattern in a purification device disclosed herein, wherein in this purification device the first purification medium comprises, for example, activated charcoal, while the second purification medium comprises a reverse osmosis module. It can be seen that the water to be purified flows through the inlet 21, passes through the first purification medium (not shown), arranged in the first receptacle 112, flows through the first ascending channel 114 into the reverse osmosis module 116, which is disposed in the second receptacle 113, and then passes through this reverse osmosis module.

In this case the bad water (or concentrate, shown by dashed lines), which has accumulated during the purification process, remains in the outer area of the reverse osmosis module and moves downwards, from where it is then fed through the second ascending channel 115 in the direction of the outlet 23 for the bad water (or concentrate).

The good water (or permeate), which accumulated during reverse osmosis, flows into the inner area of the reverse osmosis module 116 and is fed from there in the direction of the outlet 22 for the good water or (permeate).

Figure 5A:
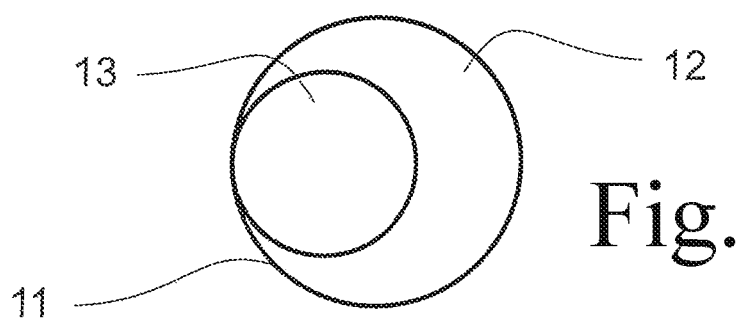
FIG. 5 shows in schematic form conceivable and actual geometric shapes of the housing 11, the receptacles 12 and 13 (FIGS. 5A and 5B) and the ascending or descending channels 14 and 15 (FIG. 5C). The location of the cover lid 16 is indicated in FIG. 5C.
Figure 5B:
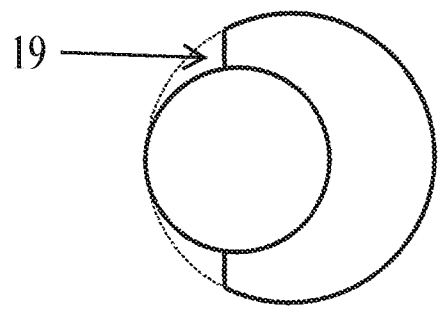
Figure 5C:
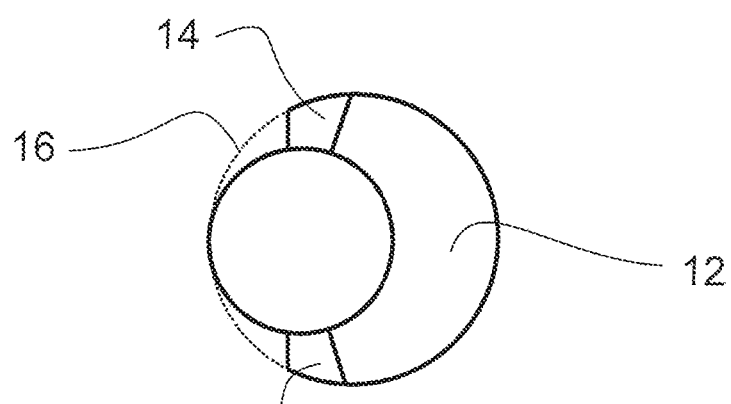

FIGS. 5A-5C show once more the development of the utilization of the space for the receptacles 12 and 13 for the first and second purification medium in a housing 11 having a substantially round cross section.

The term "substantially round cross section" means that the base surface of the housing is derived from a circular shape, an ellipse or an oval, but may have recesses (see e.g. 19 in FIG. 5B) or similar modifications. Preferably in this case the cross section is, moreover, a substantially circular cross section.

The receptacle 13 for the second purification medium is arranged eccentrically with respect to the longitudinal axis of the housing 11. For example, a prefabricated reverse osmosis module having a circular cross section may be inserted into the receptacle 13.

In principle, the receptacle 12 for the first purification medium may occupy the remaining surface of the housing 11 that is not occupied by the receptacle 13 for the second purification medium. However, for hydrodynamic reasons it does not make any sense to utilize this surface area as far as up to the outermost corners, because the net result would be the formation of dead water that is not thoroughly washed by the water to be purified. These areas can be used at least in sections for the ascending channels 14 and 15. Furthermore, that area of the substantially circular cross section of the housing that is not very useful for receptacles for purification media or ascending channels can be modified with recesses or similar modifications.

In this case the net result is a receptacle 12 that has an approximately crescent-shaped cross section and avoids an acute ("dead") angle that is not thoroughly washed by the water to be purified.

In a preferred embodiment the receptacle for the second purification medium is, in fact, arranged eccentrically with respect to the longitudinal axis of the housing, but remains inside the round cross section of the cover lid 16, which in essence determines the shape of the housing 11.

It should be noted that the shape, shown in FIG. 5A, cannot be readily produced in terms of production engineering.

What is claimed is:

1. Purification device for water, comprising:
    a housing having an upper end and a lower end arranged along a longitudinal axis of the housing, and a substantially round cross section that extends radially outward, between the upper end and the lower end, from the longitudinal axis,
    wherein the housing comprises a first receptacle, arranged parallel to the longitudinal axis of the housing and having a cross section that extends radially relative to the longitudinal axis, and a second receptacle, also arranged parallel to the longitudinal axis of the housing and also having a cross section that extends radially relative to the longitudinal axis,
    wherein the second receptacle is arranged eccentrically with respect to the longitudinal axis of the housing,
    wherein the first receptacle projects radially no further than does a substantially crescent-shaped cross section between the upper end and the lower end, and extends circumferentially along an outer circumference of the substantially round cross section of the housing,
    wherein the cross section of the second receptacle is substantially circular between the upper end and the lower end,
    wherein the substantially crescent-shaped cross section radially envelops a majority of a circumference of the substantially circular cross section of the second receptacle, and
    wherein the substantially round cross section of the housing consists of (i) the substantially crescent-shaped cross section and (ii) the substantially circular cross section of the second receptacle.

2. Purification device, as claimed in claim 1, wherein the housing further comprises at least one channel, arranged parallel to the longitudinal axis of the housing, having a cross section that extends radially relative to the longitudinal axis, and configured to transport the water to be purified in an ascending or a descending direction.

3. Purification device, as claimed in claim 1, further comprising:
    a first purification medium arranged in the first receptacle, and
    a second purification medium arranged in the second receptacle,
    wherein the second purification medium has a substantially round cross section.

4. Purification device, as claimed in claim 3, wherein the second purification medium has a substantially circular cross section.

5. Purification device, as claimed in claim 4, wherein the second purification medium is a reverse osmosis module.

6. Purification device, as claimed in claim 4, wherein the second purification medium is a module, a bed, a capsule or a cartridge, which contains an activated charcoal/ion exchange resin mixture or stack.

7. Purification device, as claimed in claim 3, wherein the first purification medium is a module, a bed, a capsule or a cartridge, which contains a medium selected from the group consisting of:
    activated charcoal,
    ion exchange resin, crosslinked polysaccharides, and
activated charcoal/ion exchange resin mixture or stack.

8. Purification device, as claimed in claim 1, further comprising at least one cover lid, which is disposed at the upper end of the housing, wherein the cover lid has at least one element selected from the group consisting of:
an inlet for the water to be purified,
an outlet for the water following purification, and/or
an outlet for any residue following the purification.

9. Purification device, as claimed in claim 8, wherein the cover lid has a frit for the emergence of a filter medium.

10. Water purification system, comprising:
a purification device as claimed in claim 1, and
at least one of the following water treatment elements:
a UV lamp,
a sterile filter,
an ultra filter,
a degassing module, and
a distillation module.

11. A water purification method, comprising employing a purification device as claimed in claim 1, for at least one task selected from the group consisting of:
purifying and producing pure or ultrapure water for laboratory use,
purifying drinking water and water for food production,
purifying water for preparing a pharmaceutical product,
desalinating seawater or brackish water,
purifying and producing water for medicinal use,
purifying and producing process water for industrial processes, and
purifying wastewater.

12. Purification device, as claimed in claim 1, wherein the first receptacle has a cross section, and wherein the housing further comprises two channels, each arranged parallel to the longitudinal axis of the housing and each having a respective channel cross section that extends radially relative to the longitudinal axis, and wherein the substantially crescent-shaped cross section consists of the cross section of the first receptacle and the respective channel cross sections of the two channels.

13. Purification device, as claimed in claim 1,
wherein the cross section of the second receptacle is completely circular and a cross section of the first receptacle is the substantially crescent-shaped cross section, and
wherein a cross-sectional sum of (i) the substantially crescent-shaped cross section of the first receptacle, (ii) the completely circular cross section of the second receptacle and (iii) a cross section of recesses in the housing corresponds to a completely round cross section.

14. Purification device, as claimed in claim 12,
wherein the cross section of the second receptacle is completely circular, and
wherein a cross-sectional sum of (i) the cross section of the first receptacle, (ii) the completely circular cross section of the second receptacle, (iii) the channel cross sections of the two channels, and (iv) a cross section of recesses in the housing corresponds to a completely round cross section.

* * * * *